United States Patent [19]
Hutchings et al.

[11] Patent Number: 4,721,003
[45] Date of Patent: Jan. 26, 1988

[54] MIXER DRIVE APPARATUS

[75] Inventors: William F. Hutchings, Fairport; George C. McIntosh, Dansville, both of N.Y.

[73] Assignee: General Signal Corp., Rochester, N.Y.

[21] Appl. No.: 846,317

[22] Filed: Mar. 31, 1986

[51] Int. Cl.$^4$ ............................................. F16H 1/06
[52] U.S. Cl. ................................ 74/421 R; 74/606 R; 277/81 R; 277/93 SD; 277/93
[58] Field of Search .................. 277/93, 93 SD, 81 R; 74/421 R, 421 A, 606; 403/344, 356

[56] References Cited

U.S. PATENT DOCUMENTS

| | | | |
|---|---|---|---|
| 1,656,935 | 1/1928 | Bahan | 403/344 |
| 1,903,060 | 3/1933 | Mitchell | 29/115 |
| 2,257,747 | 10/1941 | Jones | 74/421 A |
| 2,441,446 | 5/1948 | Schmitter | 74/411 |
| 2,505,575 | 4/1950 | Ray | 74/421 R |
| 2,612,788 | 10/1952 | Christian | 74/421 R |
| 2,639,624 | 5/1953 | Falk | 74/421 R |
| 2,670,697 | 3/1954 | Meakin | 74/421 R |
| 2,881,880 | 4/1959 | Munchauer | 74/421 R |
| 3,373,626 | 3/1968 | Maurer et al. | 74/421 R |
| 3,760,605 | 9/1973 | Schroder | 464/73 |
| 4,381,867 | 5/1983 | Ohgoshi | 277/93 SD |

FOREIGN PATENT DOCUMENTS 0123802  1/1949  Sweden ............... 74/421 R

Primary Examiner—Peter A. Aschenbrenner
Assistant Examiner—Gerald Anderson
Attorney, Agent, or Firm—Martin LuKacher

[57] ABSTRACT

Mixer drive apparatus, which provides gear reduction for driving the impeller shaft of the mixer. A drive shaft from an electric motor is parallel to the impeller shaft which extends through a support collar of a housing. The collar has a hole therethrough through which the impeller shaft extends into the housing. A hub is rotatably mounted on the outside of the housing and carries a gear which is coupled to a pinion on the motor drive shaft. A coupling is attached to the hub and bridges the hole in the collar. The end of the impeller shaft is cantilevered and overhung from the coupling. A gap is defined between the impeller shaft and the inside surface of the support collar which is adapted to receive a seal assembly. The seal assembly includes a retainer hub which captures a sleeve containing the seal structure in the gap between the coupling and the retainer. The seal sleeve may readily be removed upon disassembly of the coupling, which has two sections defining a split ring which clamps the upper end of the impeller shaft, and has a thrust plate with a bolt therethrough into the end of the impeller shaft for axially adjusting the location of the shaft so as to bring the seal sleeve into engagement with the coupling for rotation therewith. A support collar on the impeller shaft engages the retaining hub when the coupling releases the shaft for the removal and replacement of the seal sleeve assembly. A seal captured by the collar engages the retainer hub and provides a pressure seal to facilitate replacement of the seal sleeve when the mixer is used with a pressurized vessel.

18 Claims, 4 Drawing Figures

MIXER DRIVE APPARATUS

DESCRIPTION

The present invention relates to mixer apparatus for mixing liquids, liquid suspensions and other materials, and particularly to mixer apparatus having an improved impeller drive mechanism.

The invention is especially suitable for use in providing mixer apparatus for industrial and commercial applications where mixing is part of the manufacturing or formulating process. Mixer apparatus provided by the invention may also be used for waste water treatment and elsewhere where significant volumetric flow and agitation of the medium being mixed is desired.

The invention provides mixer apparatus suitable for industrial and commercial mixing applications as well as for waste water treatment applications which is reliable in performance and can be manufactured at low cost, and particularly wherein seals can be provided which prevent the escape of the medium being mixed or processed from the tank or vessel in which the medium being mixed is contained.

In order to develop the necessary torque and speed for a mixing impeller, a gear reduction drive is used for coupling the drive shaft of the electric motor to the impeller shaft. A high reliability gear reducer drive provided in accordance with the invention utilizes an electric motor drive shaft which is parallel to the impeller shaft. While gear reduction drives between parallel drive and driven shafts have heretofore been proposed, the proposed designs have required expensive bearing and alignments. In mixing applications, there is often the need to provide seals to prevent the escape of the material being mixed through the mixer drive into the environment. Parallel shaft gear reduction drives which have been proposed have no provision for such seals.

Seals are subject to wear especially when mounted on shafts subject to significant deflection (run-out). It has heretofore been necessary to use seals specifically designed to operate under conditions of large run-out (for example, approximately 60 mils). Such seals are far more expensive than seals which can operate reliably at low run-out (for example, approximately 5 mils).

There are therefore a complex of requirements applicable to mixer applications which have militated against the use of parallel shaft gear reduction drives for such applications.

Accordingly, it is the principal object of the present invention to provide an improved mixer drive capable of serving commercial and industrial applications with reliability and which may be implemented at reasonably low cost.

It is another object of the present invention to provide an improved mixer drive utilizing a parallel shaft gear reducer capable of accommodating seals.

It is a still further object of the present invention to provide an improved gear reducer mixer drive which accommodates seals in a compact manner without increasing the size of the drive unit.

It is a still further object of the present invention to provide improved mixer drive apparatus which may be converted in the field to a sealed drive without modification.

It is a still further object of the present invention to provide improved sealed mixer drive apparatus wherein the deflection of the impeller shaft which is sealed is controlled so as to avoid the need for seals designed to operate under large run-out conditions.

It is a still further object of the present invention to provide improved sealed mixer drive apparatus wherein seals are accessible for ready removal and replacement.

It is a still further object of the present invention to provide improved sealed mixer drive apparatus which maintains a static seal on the tank with which the apparatus is being used when running seal units are being removed and replaced.

Briefly described, mixer drive apparatus embodying the invention has a housing. A collar extends from the housing and defines, on the inside thereof, a hole through the collar which provides access for the impeller shaft into the housing. A rotatable hub coaxial with the collar is disposed outside of the collar. A gear is mounted on the hub. A drive shaft, as from an electric motor, may be spaced from and parallel to the impeller shaft. A pinion on the drive shaft is coupled to the gear on the hub. A coupling is mounted on the hub and bridges the collar and the hole therein. The impeller shaft is overhung and particularly cantilevered from the coupling. The impeller shaft extends through the hole and is located by the coupling to define an annular gap between the impeller shaft and the collar. The gap has a width radially of the impeller shaft substantially larger than the running clearance for the impeller shaft. The gap is adapted to receive a seal assembly. The seal assembly may be inserted in the field (factory changes are not needed), and is captured in the gap between the coupling and the housing.

The seal assembly includes a retaining hub which is fixedly disposed against the inside of the collar and a sleeve assembly which is disposed around the impeller shaft. The sleeve assembly includes a seal member and may be either a dry running seal or a seal which is pressurized with lubricant. The lubricant enters a cavity in the gap containing the sleeve lubricant. The coupling is preferably a split ring which clamps the top end of the impeller shaft and may be removed so as to expose the sleeve assembly of the seal assembly for ready removal and replacement.

A collar on the impeller shaft is disposed to drop on a support surface of the retaining hub when the shaft is released from the coupling for the removal and replacement of the sealing sleeve assembly. A ring seal may be captured in the collar to provide a static pressure seal when the collar engages the retaining hub.

The coupling holds the top end of the shaft rigidly and prevents excessive run-out at the location of the seals, which are close to the coupling and therefore not subject to excessive movement even when the shaft is deflected in response to fluid forces encountered in mixing applications. Thus, low cost seals may be used.

The invention therefore enables the use of a parallel shaft gear reduction drive which may be implemented at low cost and which is capable of being sealed readily by the insertion of a seal assembly. The invention also enables use of seal assemblies having low cost seals and provides, nevertheless, acceptable reliability and life.

The foregoing and other objects, features and advantages of the invention will become more apparent from a reading of the following description in connection with the accompanying drawings in which.

Figure 1:
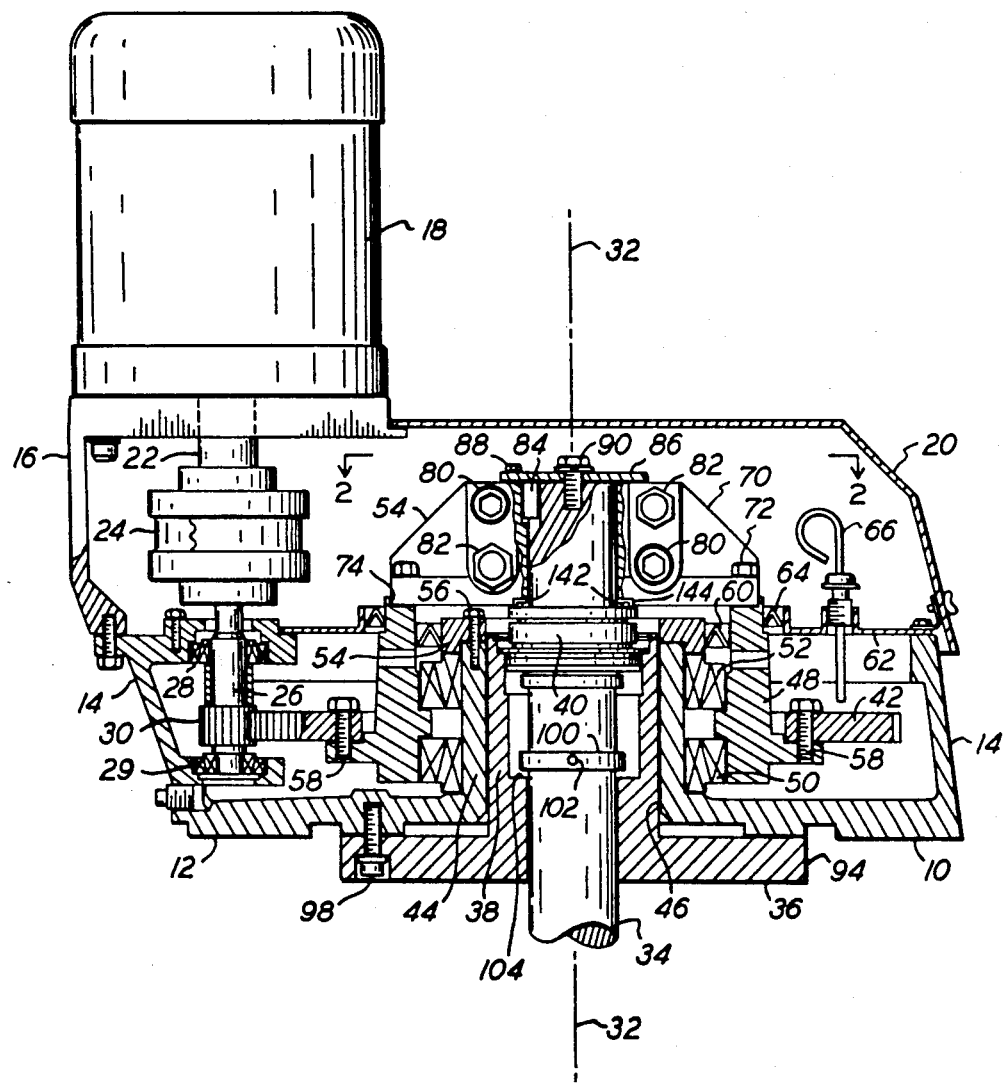
FIG. 1 is a sectional view, in elevation, of mixer drive apparatus embodying the invention.
Figure 2:
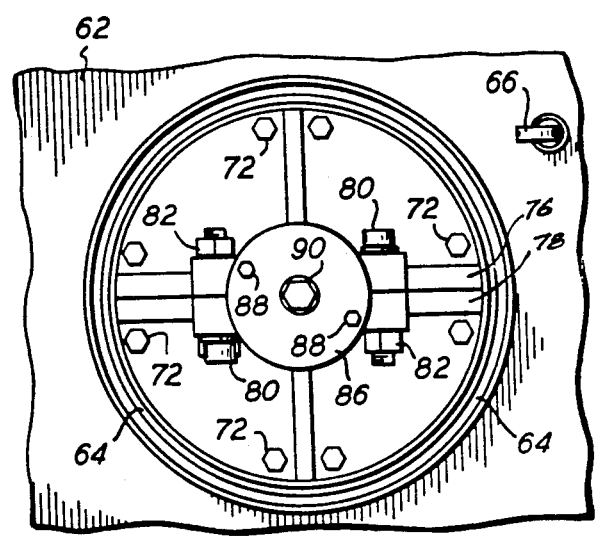
FIG. 2 is a plan view, taken along the line 2—2 in FIG. 1 and showing the impeller shaft coupling structure from the top.

Referring more particularly to the drawings, there is shown a housing 10 having a base plate 12 and side walls 14. The housing 10 has an upper section 16 on which an electric motor 18 is mounted. The housing may be covered with a guard 20.

The drive shaft of the apparatus is provided by the shaft 22 of the motor which is connected through a flexible coupling 24 to a drive shaft extension 26. Bearings 28 and 29, secured to the housing 10, guide and rotatably support the shaft extension 26. The shaft extension 26 is the drive shaft portion on which a pinion 30 is mounted. The drive shaft has an axis of rotation which is parallel to the axis 32 of rotation of an impeller shaft 34.

The impeller shaft is coupled at the top thereof to the mixer drive and extends downwardly out of the mixer drive housing 10 into a tank or other vessel in which the materials to be mixed are contained. This tank may be a closed tank, in which event the base plate 12 is connected to the nozzle assembly of the closed tank either directly or through adapter rings or flanges (not shown) so as to seal the nozzle. The closed tank is sealed by a seal assembly 36 which includes a retaining hub 38 and a sealing sleeve assembly 40 which will be described in detail hereinafter. The sleeve assembly 40 provides the seal and the retaining hub 38 provides a housing for the sleeve assembly 40. The mixer apparatus may be used on an open tank, in which event the seal assembly need not be used. It will be apparent as the description proceeds that the seal assembly may readily be inserted in the field and without any modification of the mixer unit when required.

The impeller shaft torque and speed reduction is obtained through the use of a ring gear 42 which is coupled to the pinion 30. The gears may provide a reduction of ten to eighteen to one in speed, and of course a corresponding increase in torque. Helical gears are shown for the ring gear 42 and the pinion 30 and are preferred. If additional reduction and speed and increase in torque is required an extra pinion and spur gear may be used.

A collar 44 extends upwardly and inwardly from the base plate 12 of the housing 10. The collar has a hole 46 therethrough, through which the impeller shaft 34 extends out of the housing 10. The housing 10, its collar 44 and other parts of the housing may be a casting which is suitable machined, especially along the inner periphery (which defines the hole 46) and outer periphery of the collar 44.

The collar 44 rotatably supports a hub 48 on bearings 50 and 52. These bearings are secured by a ring or bearing retainer 54 which is held down by screws 56, only one of which is shown in FIG. 1, but which are evenly spaced around the ring 54. The ring gear 42 is attached to a flange on the hub 48 by bolts 58. An oil seal ring 60 is disposed between the hub 48 and the retaining ring 54. The housing 10 is also closed by a cover 62 which is sealed at the hub 48 by an outer oil seal 64. A chamber is defined under the cover within the housing 10 which contains a bath of lubricating oil. A dipstick 66 may be used to check the level of the oil. All of the gear drive bearings 28, 29, 50 and 52 are oil splash lubricated.

The impeller shaft 34 is cantilevered at its top end by a coupling 70 which is secured to the top end of the hub 48 by bolts 72. The top end of the hub 48 is rabbitted as shown at 74 so as to locate the coupling. The coupling has two sections 76 and 78 which define a split ring. The ring may have bearing surfaces on the inside thereof which engage the top end of the shaft. Four bolts, or cap screws 80 and their associated nuts 82 extend through the sections 76 and 78 and the sections act as clamping members and clamp the shaft 34 at its top end thereby supporting and cantilevering the shaft 34 only at its top end. No special guide bearings for the shaft are used or required. A key 84 connects the coupling to the shaft which has a key way for receiving the key 84. Portions of the inner periphery of the split ring may be recessed so as to assure contact along four diametrically opposed surfaces of the top end of the shaft 34.

A thrust plate 86 is attached by screws 88 to the top of the coupling 70. A bolt or cap screw 90 extends through a hole which is along the axis 32 of the shaft into a threaded hole through the top surface of the top end of the shaft 34. The axial position of the shaft 34 may be adjusted by turning the screw. Preferably the shaft end is indexed and registered against the undersurface of the thrust plate when the shaft is located and secured to the coupling 70.

The hole 46 in the collar 44 and the shaft 34 define an annular gap therebetween. This gap is substantially wider than required to accommodate the run-out of the shaft due to deflecting forces which may be applied thereto. Such forces are generated by fluid forces on the impeller as the impeller rotates in the medium being mixed. The gap is provided to receive the seal assembly 36. The retaining hub 38 of the assembly has a flange 94 which is connected to the housing base plate by bolts 98. The retaining hub 38 captures the sealing sleeve assembly 40 inside the gap and between the retaining hub 38 and the coupling 70.

A collar 100 is attached to the impeller shaft as by a set screw 102 so as to normally dispose the under surface of the collar 100 above the surface of a radially inward extending step 104 of the retaining hub 38. Preferably a sealing ring 106, which may be an "O" ring, is captured in a notch in the under surface of the collar 100 adjacent to the surface of the shaft 34. This sealing ring 106 is better shown in FIG. 3. The sealing ring fits into a chamfer 108 which extends around the inner edge of the step 104. When the split ring coupling 70 is loosened, the shaft 34 drops until the collar 100 engages the step 104. A static seal is then provided by the sealing ring 106. Then the closed tank with which the mixer apparatus is associated and on which the housing 10 is secured remains sealed. The coupling can then be removed to expose the sleeve assembly 40 for ready removal and replacement from the top of the apparatus.

The flange 94 of the retaining hub 38 may be welded thereto as shown at 110. The retaining hub may be made of stainless steel or any other suitable alloy or material in order to withstand corrosive environments, and a facing 112 may be adhered to the underside of the retaining hub 38 and its flange 94.

Figure 3:
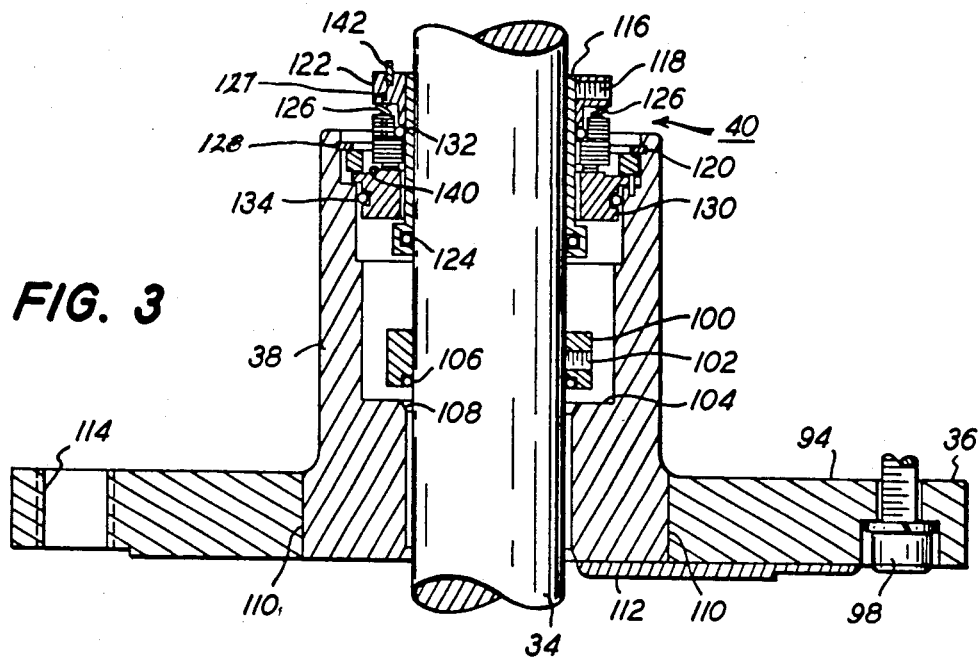
FIG. 3 is an enlarged sectional view of the seal assembly of the mixer apparatus shown in FIG. 1.

FIG. 3 shows additional threaded holes 114. which may be used to attach the flange which assembles the mixer drive to the nozzle of a closed tank.

FIG. 1 and FIG. 3 illustrate a single mechanical sleeve assembly 40 as the seal. This assembly may be provided as a cartridge and secured in the retaining hub 38 by a retaining ring 120, which may be a "C" washer. The sleeve assembly 40 has a sleeve 116 which is attached by a set screw 118 in to a ring 122 around the sleeve 116. The sleeve 116 is sealed by a seal ring (an "O" ring) 124. A plurality of springs 126 which bear against the ring 122 compress carbon washer 128 against a ceramic seat ring 130. Drive pins 127 extend from the ring 122 into the washer 128 so that the ring 122 and washer 128 and sleeve 116 are coupled to rotate together. "O" ring seals 132 and 134 are located between the washer 128 and the sleeve 116 and between the inner periphery of the retaining member 38 and the seat 130. The seat 130 defines a seal face 140 with the washer 128. Pins 142 (see also FIG. 1) extend into a slot 144 in the underside of the coupling 70. These pins 142 engage the coupling 70 in the slot 144 so that the sleeve assembly consisting of the inner sleeve 116, the ring 122 and the washer stack 128 rotates with the shaft 34.

The seal face 140 is extremely close to the coupling member. The coupling member rigidly clamps and supports the shaft 34. Accordingly there is very little deflection and run-out at the location of the seal face 140. Such run-out can be controlled to about 5 mils or less. Accordingly, the sleeve assembly 40 of the seal may be a low run-out dry running seal as shown in FIGS. 1 and 3.

Figure 4:
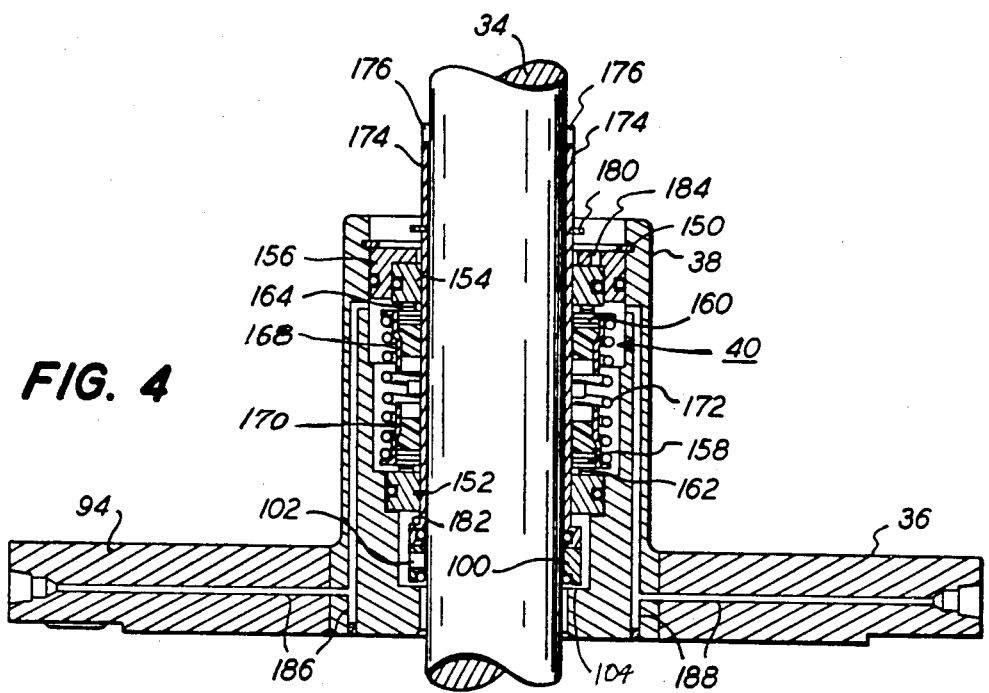
FIG. 4 is a sectional view in elevation, and similar to FIG. 3 showing a sealing assembly containing a double mechanical seal which may be used in lieu of the single mechanical seal assembly shown in FIG. 3.

When escape of any gas or other medium from the vessel is detrimental, a pressurized double mechanical seal, such as shown in FIG. 4 may be used as the seal sleeve assembly 40. This assembly is also removable and replaceable by removing a retaining ring 150, similar to the ring 120 (FIG. 3). This sleeve assembly 40 has two seat rings 152 and 154 at the bottom and top thereof. These rings provide seat members or seats. The upper seat ring 154 is assembled with a flanged ring 156 which is retained by the retaining ring 150. The rotating parts of the assembly 40 have two carbon washers 158 and 160 which, with the seats 152 and 154 define sealing faces 162 and 164. The washers 158 and 160 are biased against the faces by collars 168 and 170 which are engaged by a helical spring 172. These rotating parts of the sleeve assembly 40 rotate with a sleeve 174 which is indexed against the top surface of the collar 100. Tangs 176 extend upwardly into the slot 144 (FIG. 1) and engage the coupling 70 so that the sleeve 174 and the rest of the rotating parts of the assembly 40 are driven and rotate with the shaft 37. A ring 180 which is disposed in a slot in the sleeve 174 retains the sealing assembly 40 on the sleeve 174 between the ring 180 and a step 182 so that the sleeve 174 and all of the other parts of the sealing assembly 40 may be removed as a unit for replacement when the seal faces 162 and 164 wear out. Holes 184 for pulling tools may be provided in the flanged ring 156 to assist in the removal of the sealing assembly 40.

The sealing faces are kept under pressure of a hydraulic liquid, such as a conventional seal lubricant, which is supplied through lubricant inlet and outlet passages 186 and 188. The cavity into which the pressurized lubricant is supplied is defined by the inside surface of the retaining hub 38, the sleeve 174 and the upper and lower seats 152 and 154, 156. Seal rings, such as "O" rings are provided between the sleeve 174 and the shaft 37 and between the seats 154 and 156 and the seat 52 and the retaining hub so as to preclude any leakage through the seal assembly 36.

The rotary parts of the sealing sleeve assembly 40 of the double mechanical seal assembly 36 shown in FIG. 4, similarly with the rotary seal assembly 40 of the single mechanical seal assembly shown in FIG. 3 are located adjacent to the rigidly supported top end of the shaft 34 where deflection is minimal and run-out at the seal faces 162 and 164 is not excessive (for example, approximately 5 mils). Accordingly the sealing sleeve assembly 40 provides reliable sealing performance over a long lifetime.

Since the cavity containing the rotating seal parts of the double mechanical seal assembly shown in FIG. 4 are pressurized to a pressure greater than the tank with which the mixer drive is used, the pressure in the tank is not capable of driving material or gases contained therein through the seal assembly 36 into the environment.

It will be apparent that removal of the coupling 70 will enable the replacement of the rotary sealing sleeve 40 parts from the top of the unit as was the case with the single mechanical seal shown in FIGS. 1 and 3.

From the foregoing description it will be apparent that there has been provided improved mixer drive apparatus. Variations and modifications of the herein described apparatus, within the scope of the invention, will undoubtedly suggest themselves to those skilled in the art. Accordingly, the foregoing description should be taken as illustrative and not in a limiting sense.

We claim:

1. Mixer drive apparatus which comprises a housing having a collar, said collar having an inside and an outside and defining on the inside thereof a hole having a first axis which extends through said collar and said housing, a rotatable hub coaxial with said collar and disposed on the outside of said collar, a gear mounted on said hub and rotatable therewith, a drive shaft having a second axis parallel to and spaced from said first axis, a pinion on said drive shaft coupled to said gear, a coupling member on said hub and bridging said collar and said hole, an impeller shaft cantilevered from said coupling, said impeller shaft extending through said hole along said first axis and being located by said coupling to define an annular gap between said impeller shaft and said collar in said hole, said gap having a width radially of said impeller shaft substantially larger than the running clearance for said impeller shaft and providing space for a seal assembly.

2. The apparatus according to claim 1 wherein a seal assembly is captured in said gap between said coupling and said housing.

3. The apparatus according to claim 2 wherein said seal assembly includes a retaining hub in said gap fixedly disposed against the inside of said collar, and a sleeve assembly around said shaft, said sleeve assembly including seal members, said coupling being removably mounted on said rotatable hub and being removably mounted to said impeller shaft for exposing said sleeve assembly for removal and replacement.

4. The apparatus according to claim 3 wherein said impeller shaft has an end extending into said coupling, and said coupling comprises first and second clamping members defining clamping surfaces opposed to each other diametrically of said end of said impeller shaft, and means for securing said first and second members together to clamp said end of said impeller shaft.

5. The apparatus according to claim 4 wherein said first and second clamping members define a split ring about said end of said impeller shaft.

6. The apparatus according to claim 4 wherein said coupling further comprises a thrust plate on said coupling facing said end of said impeller shaft which is transverse to the axis thereof, and means attached to said thrust plate for axially moving said impeller shaft with respect to said thrust plate and securing the said impeller shaft thereto.

7. The apparatus according to claim 3 wherein said sleeve assembly includes parts assembled in fixed relationshiip with said retaining hub and in rotating relationship thereto, and said rotating parts having an extension in engagement with said coupling and being rotatable therewith.

8. The apparatus according to claim 7 wherein means are provided for connecting the rotatable parts of said sleeve assembly to said impeller shaft.

9. The apparatus according to claim 3 wherein said retaining hub has a wall which is disposed against said collar and a step defining surface extending radially inward toward the axis of said hole, said impeller shaft having a support collar attached thereto, said support collar being spaced from said surface of said step when said impeller shaft is secured to said coupling and being engageable with said surface of said step when said impeller shaft is released from said coupling whereby to support said shaft while said sleeve assembly is being removed and replaced.

10. The apparatus according to claim 9 further comprising a seal ring captured by said support collar for providing a seal when said support collar engages said surface of said step.

11. The apparatus according to claim 3 wherein said housing has a base plate from which said collar extends axially toward said coupling, said retaining hub having a flange secured to said base plate.

12. The apparatus according to claim 1 wherein said seal assembly comprises seal providing means and a seal housing disposed within said collar in said gap for capturing said seal providing means therein.

13. The apparatus according to claim 12 wherein said seal providing means comprises a seal member on said impeller shaft and a seat member, said seal housing having a retaining hub disposed inside and against the inner periphery of said collar, said seat member bearing and held stationary against said retaining hub.

14. The apparatus according to claim 13 wherein said seal member comprises a sleeve on said impeller shaft, said seat member and another seat member constituting a pair of seat members axially spaced from each other to define a cavity in said gap between said seat members, said impeller shaft, and said retaining hub, and means for supplying pressurized hydraulic fluid to said cavity.

15. A shaft drive mechanism which comprises a drive shaft and a driven shaft having their axes parallel to and spaced from each other, a housing having means for rotatably supporting said shafts, said means for supporting said driven shaft comprising a collar forming part of said housing and extending inwardly to an open end thereof, said collar having a hole therethrough and providing at one end thereof an opening for said driven shaft into said housing, a hub rotatably mounted on the outside of said collar, a gear on said hub, said drive shaft having a pinion thereon coupled in driving relationship with said gear, a coupling having a pair of sections defining a separable split ring, said coupling being secured to said hub and bridging said hole in said collar, means for removably securing said impeller shaft in clamped relationship with said sections within said split ring.

16. The mechanism according to claim 15 wherein said impeller shaft has an end surface perpendicular to the axis thereof, a thrust plate secured to said coupling at the end of said split ring facing away from said hub, and said end surface of said impeller shaft being secured to said thrust plate.

17. The mechanism according to claim 16 further comprising a bolt extending through said thrust plate and said end surface of said impeller shaft in threaded engagement with said impeller shaft for moving said impeller shaft axially to locate it in said split ring.

18. The mechanism according to claim 17 further comprising a key in at least one of said split ring sections and in engagement with a key way in said impeller shaft, said key being captured by said thrust plate.

* * * * *